United States Patent [19]

Anderson et al.

[11] Patent Number: 5,277,705
[45] Date of Patent: Jan. 11, 1994

[54] POWDER COLLECTION APPARATUS/METHOD

[75] Inventors: Iver E. Anderson; Robert L. Terpstra; Jeffery A. Moore, all of Ames, Iowa

[73] Assignee: Iowa State University Research Foundation, Inc., Ames, Iowa

[21] Appl. No.: 997,725

[22] Filed: Dec. 30, 1992

[51] Int. Cl.[5] ............................................. B01D 45/12
[52] U.S. Cl. ...................................... 55/319; 55/345; 55/459.1; 55/459.2
[58] Field of Search ................... 55/204, 319, 237, 345, 55/349, 459.1, 459.2

[56] References Cited

U.S. PATENT DOCUMENTS

| | | |
|---|---|---|
| 2,878,891 | 3/1959 | Ross et al. ........................ 55/345 X |
| 3,834,629 | 9/1974 | Hellman et al. . |
| 4,365,635 | 12/1982 | Bowman ........................... 55/204 X |
| 4,490,162 | 12/1984 | Davis ............................... 55/319 X |
| 4,619,845 | 10/1986 | Ayers et al. . |
| 4,662,909 | 5/1987 | Durr ................................. 55/345 X |
| 5,125,574 | 6/1992 | Anderson et al. . |

*Primary Examiner*—Charles Hart
*Attorney, Agent, or Firm*—Flynn, Thiel, Boutell & Tanis

[57] ABSTRACT

Device for separating and collecting ultrafine atomized powder from the gas stream of a gas atomizing apparatus comprises a housing having an interior wall oriented at an angle relative to horizontal so as to form a downwardly converging, conical expansion chamber, an inlet conduit communicated to the expansion chamber proximate an upper region thereof for receiving the gas stream, and an outlet proximate a lower region of the expansion chamber. The inlet conduit is oriented at a compound inclined angle (with respect to horizontal) selected to promote separation and collection of powder from the gas stream in the expansion chamber. The compound angle comprises a first entrance angle that is greater than the angle of repose of the powder on the housing interior wall such that any powder accumulation in the inlet conduit tends to flow down the wall toward the outlet. The second angle is selected generally equal to the angle of the housing interior wall measured from the same horizontal plane so as to direct the gas stream into the expansion chamber generally tangent to the housing interior wall to establish a downward swirling gas stream flow in the expansion chamber. A powder collection container is communicated to the outlet of the expansion chamber to collect the powder for further processing.

16 Claims, 4 Drawing Sheets

POWDER COLLECTION APPARATUS/METHOD

CONTRACTUAL ORIGIN OF THE INVENTION

The United States Government has rights in this invention pursuant to Contract No. W-7405-ENG-82 between the U.S. Department of Energy and Iowa State University, Ames, Ia., which contract grants to the Iowa State University Research Foundation, Inc. the right to apply for this patent.

FIELD OF THE INVENTION

The present invention relates to powder collection apparatus and methods wherein powder can be separated and collected from a process stream, such as especially a process stream of a gas atomizing apparatus highly loaded with ultrafine metallic powder.

BACKGROUND OF THE INVENTION

Existing equipment for separation and collection of fine powder from a gas stream, typical of the process stream of a gas atomizer apparatus for making metallic powder, employ a combination of a primary powder container fed from a concentric reducer at the bottom of the atomizer chamber and a secondary cyclone collector fed from a duct at an elevated position on the side of the atomizer chamber. Alternative separator/collector equipment utilizes the same bottom-mounted primary powder container but the secondary cyclone is fed from a duct closely coupled to the primary powder container. Still other equipment utilizes a reducer that is bottom-mounted concentric to the atomizer chamber and that feeds a curved duct leading to a primary cyclone separator/collector. The primary powder container is eliminated in such equipment. The latter type of separator/collector equipment is illustrated in the Anderson U.S. Pat. No. 5,125,574 which discloses a gas atomizing apparatus for atomizing a melt using high pressure, supersonic gas flow from an atomizing nozzle to make ultrafine, generally spherical metallic powder having a rapidly solidified microstructure.

All three types of separator/collector equipment have some advantages (e.g. passive operation and suitable collection efficiency for conventional powder sizes, such as most powders with diameters greater than 20 microns) and some disadvantages (e.g. unintended powder accumulation regions, powder contamination from cyclone wall erosion, and unsuitable collection efficiency for ultrafine powder sizes, such powders with diameters less than about 20 microns).

It is an object of the present invention to provide an improved powder separator/collector that reduces unintended powder accumulation regions that, in turn, reduce yields achievable, reduces powder contamination from equipment wall erosion, and improves collection efficiency of ultrafine powder sizes.

SUMMARY OF THE INVENTION

The present invention provides an improved device for separating and collecting powder from a gas stream, such as especially a gas stream of a gas atomizing apparatus highly loaded with ultrafine powder. The device comprises a housing having an interior wall oriented at an angle relative to horizontal so as to form a downwardly converging, conical expansion chamber, an inlet conduit communicated to the expansion chamber proximate an upper region thereof for receiving the gas stream, and an outlet proximate a lower region of the expansion chamber. The inlet conduit is oriented at a compound inclined angle (with respect to horizontal) selected to promote separation and collection of powder from the gas stream. To this end, the compound angle comprises a first entrance angle that is greater than the angle of repose of the powder on the housing interior wall such that any powder accumulation in the inlet conduit tends to flow down the wall toward the outlet. The second angle is selected generally equal to the angle of the housing interior wall so as to direct the gas stream into the expansion chamber generally tangent to the housing interior wall to establish a downward swirling gas stream flow in the expansion chamber. Preferably, a helical gas stream flow is established to sweep the housing interior wall to generate mild frictional forces between the powder particles and the wall to reduce the tangential velocity of the powder particles to promote powder separation from the gas stream without contamination of the powder. A powder collection container is communicated to the outlet of the expansion chamber.

The present invention also provides a gas atomizing apparatus comprising an atomizing chamber where a melt is gas atomized to form atomized powder entrained in a gas stream, and a powder collection device of the type described hereabove for separating and collecting powder from the gas stream wherein the inlet conduit is communicated to the atomizing chamber.

DETAILED DESCRIPTION OF THE INVENTION

The present invention provides an improved device for separating and collecting powder particles from a gas stream. The invention is especially useful, although not limited to, separating and collecting ultrafine atomized powder from a highly loaded process stream of a gas atomizing apparatus. The invention will be described in detail hereinbelow with respect to use with a gas atomizing apparatus for purposes of illustration, not limitation.

Figure 1:
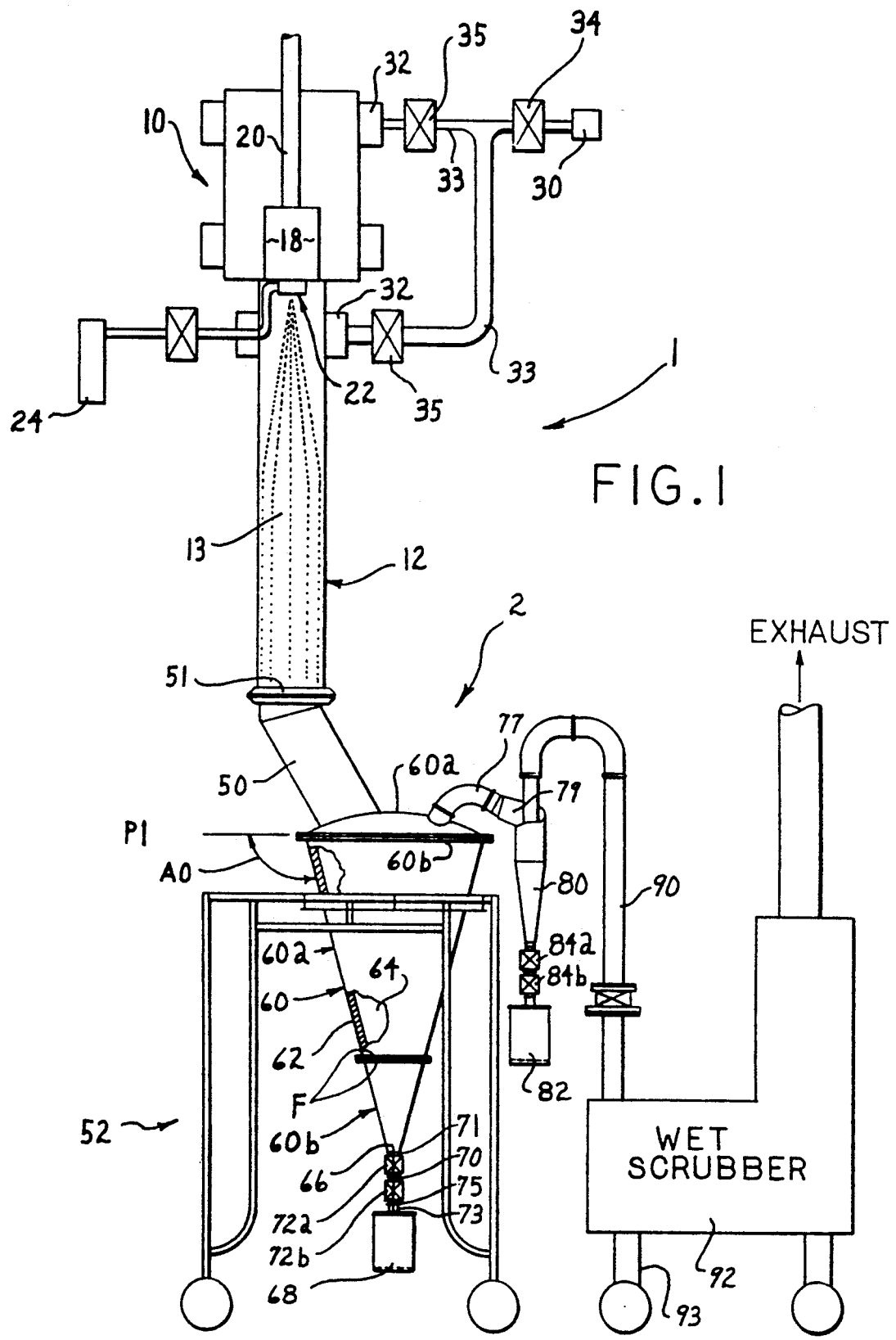
FIG. 1 is a schematic elevational view of a gas atomizing apparatus coupled to a powder separator/collector device in accordance with one embodiment of the invention.

Referring to FIG. 1, a gas atomizing apparatus 1 is shown coupled or connected to a powder separator/collector device 2 in accordance with one embodiment of the invention. The atomizing apparatus 1 includes a melting chamber 10 and a drop tube 12 located beneath the melting chamber 10 and defining a an atomizing chamber 13. The melting chamber 10 includes an induction melting furnace 18 and a vertical stopper rod 20 for controlling flow of melt from the furnace 18 to a melt atomizing nozzle 22 disposed between the furnace and the atomizing chamber. The atomizing nozzle 22 is supplied with an inert atomizing gas (e.g. argon) from a suitable source 24, such as a conventional bottle or cylinder of the appropriate gas. The atomizing nozzle 22 atomizes the melt (which may be a molten metal or metal alloy) in the form of a supersonic gas spray or stream containing generally spherical, molten droplets of melt discharged into the atomizing chamber 13. The droplets solidify quite rapidly in the atomizing chamber 13 to form fine metallic powder.

The nozzle 22 may be configured to atomize the melt to form ultrafine powder, such as powder having a maximum diameter of less than about 38 microns, although larger powder sizes can be produced if desired. A gas atomizing apparatus as well as a nozzle construction for forming ultrafine metallic powder is described in the Anderson U.S. Pat. No. 5,125,574, the teachings of which are incorporated herein by reference.

Both the melting chamber 10 and the atomizing chamber 13 are connected to an evacuation device (e.g. vacuum pump) 30 via suitable ports 32 and conduits 33. Prior to melting and atomization of the melt, the melting chamber 10 and atomizing chamber 13 are evacuated typically to a level of $50 \times 10^{-3}$ Torr to substantially remove ambient air. Then, the evacuation system is isolated from the chambers 10, 13 via the valves 34 shown and the chambers 10, 13 are positively pressurized by an inert gas (e.g. argon to about 1.1 atmosphere) to prevent entry of ambient air thereafter.

The drop tube 12 has a generally circular cross-section and typically has a diameter in the range of 1 to 3 feet, a diameter of 1 foot being employed in an exemplary embodiment of the invention. The length of the drop tube can be in the range of 10 to about 16 feet, a length of 10 feet being in an exemplary embodiment of the invention.

The atomizing chamber 13 defined within the drop tube 12 is communicated to the powder separator/collector device 2 via an inlet conduit 50 of the separator/collector device as shown in FIG. 1. The device 2 is shown mounted on a wheeled carriage 52 to facilitate positioning of the device 2 beneath the drop tube 12 with the inlet conduit 50 aligned with the atomizing chamber 13. A collar clamp 51 is used to sealingly connect the upper end of the inlet conduit 50 to the lower end of the drop tube 12 when they are aligned.

Figure 2:
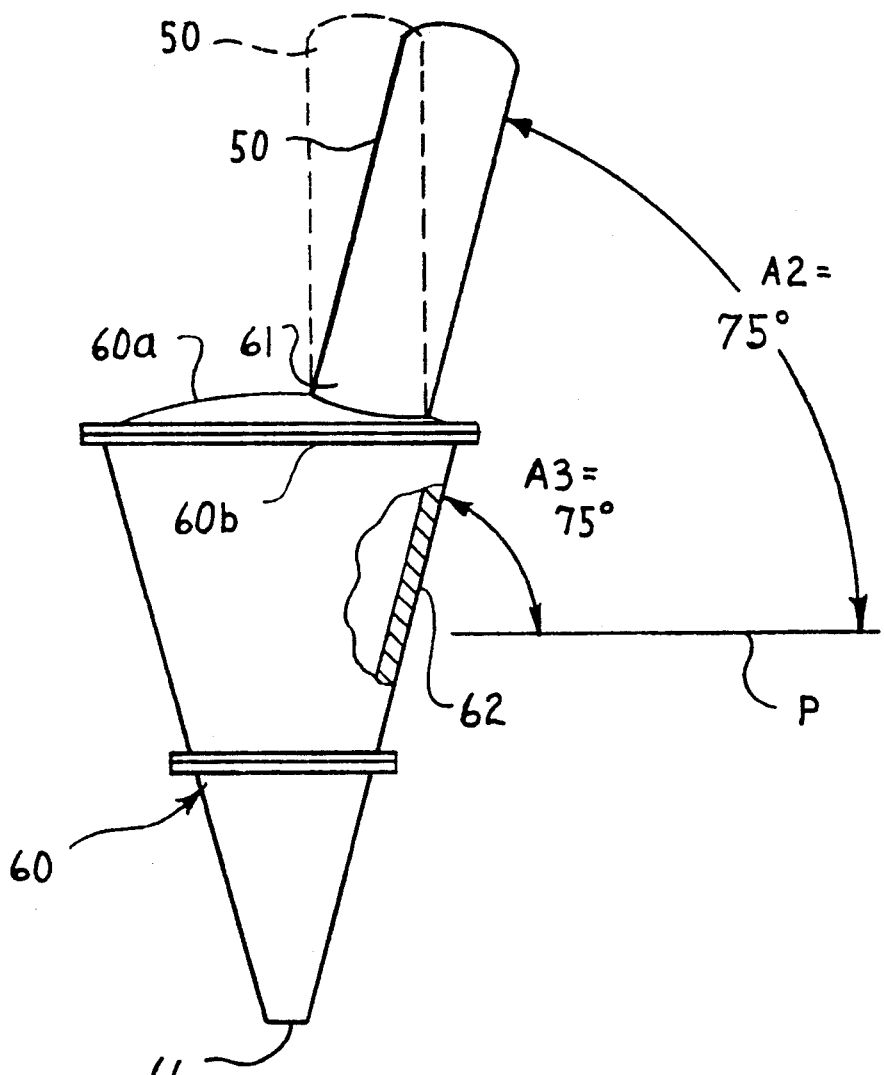
FIG. 2 is an elevational view of the powder separator/collector device of FIG. 1 taken along line 2—2 of FIG. 4. Exhaust conduits 77 are not shown for clarity in illustrating the inlet conduit 50.

Referring to FIG. 1, the separator/collector device 2 includes a housing 60 defining an interior wall 62 oriented at an angle A3 relative to a lower horizontal reference plane P (shown in FIG. 2). The housing interior wall 62 thereby forms a downwardly converging, conical expansion chamber 64 in the housing 60. The housing 60 can be fabricated as upper and lower sections 60a, 60b joined at mating flanges F1 although the invention is not so limited.

The inlet conduit 50 is welded to a removable domed top 60a of the housing 60 at a compound angle to be described herebelow so that the conduit 50 is communicated to the expansion chamber 64 proximate an upper region thereof for directing the atomizing gas stream into the chamber 64. The domed top 60a is sealingly connected to the top of the housing 60 by a bolt flange (not shown).

The housing 60 includes outlet 66 proximate a lower region of the expansion chamber 64. The outlet 66 is communicated to a removable powder collection container 68 via a conduit 70 and a pair of valves 72a, 72b. The valves 72a, 72b are opened during atomization of the melt so that powder separated and collected by the device 2 can be received and collected in the container 68.

The valve 72a is attached to the bottom of outlet 66 by a collar clamp 71 similar to collar clamp 51. The valve 72b is connected to the valve 72a by an intermediate collar clamp 70. The valve 72b is attached to a conduit 73 of the container 68 by another collar clamp 75.

Valves 72a and 72b are sealed (closed) when the powder-filled container 68 is removed from the device 2 to seal the collected powder therein for further processing thereof.

An exemplary conical housing 60 of the invention has a 36 inch diameter top opening 60b and wall 62 tapering at a 75° angle A3 relative to plane P over a length of 64 inches to a bottom outlet (opening) 66 of 2 inch diameter. Alternately, the interior wall 62 can be said to taper or converge downwardly at an angle A0 of 105° as measured from the horizontal plane P1 defined by the top of the housing 60 as shown in FIG. 1. In any event, the wall 62 defines a 30° included cone angle; i.e. the angle between the sides of the conical wall 62. The domed top 60a comprises a domed bulkhead having a 6 inch rise at the highest point.

Figure 3:
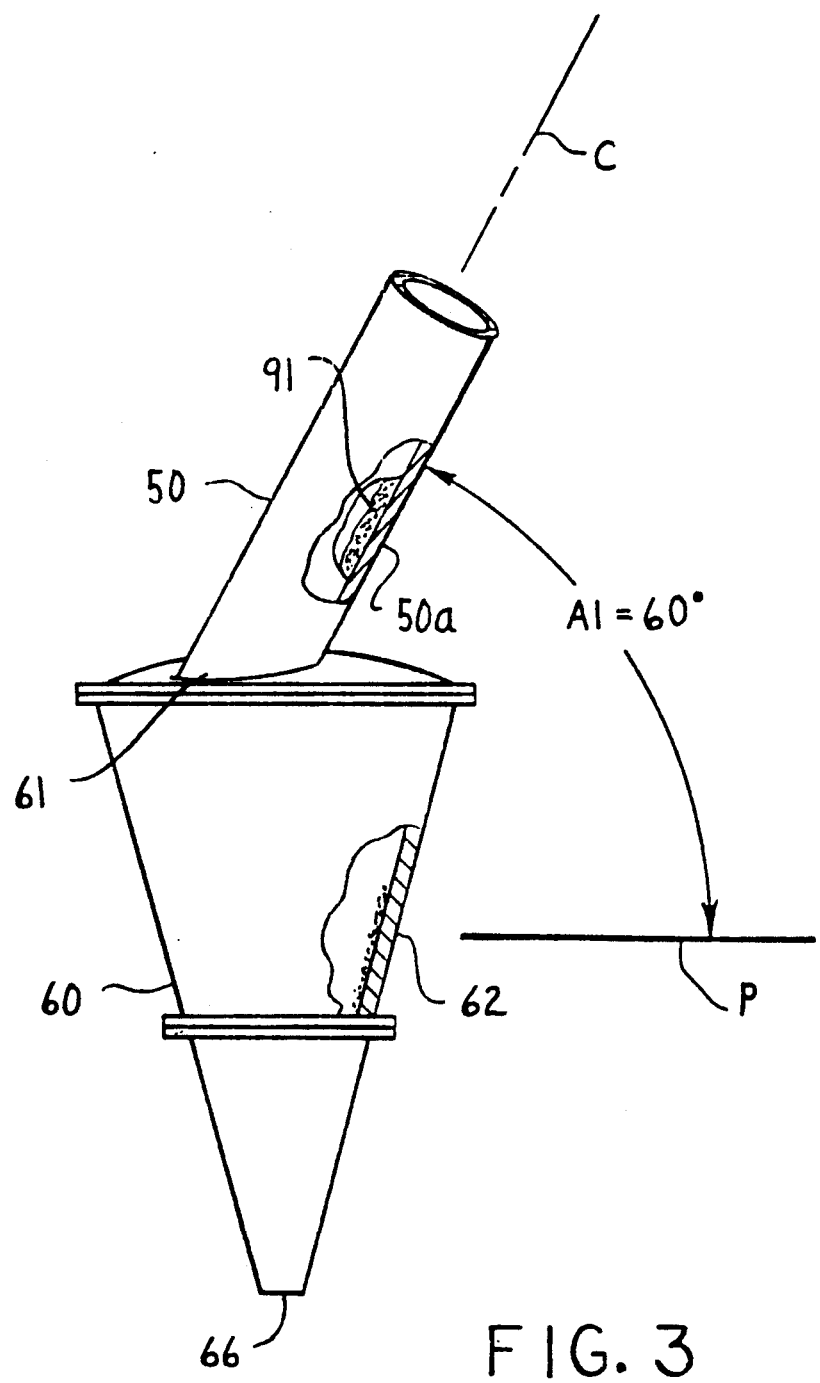
FIG. 3 is an elevational view of the powder separator/collector device of FIG. 1 taken along lines 3—3 of FIG. 4. Exhaust conduits 77 are not shown for clarity in illustrating the inlet conduit 50.
Figure 4:
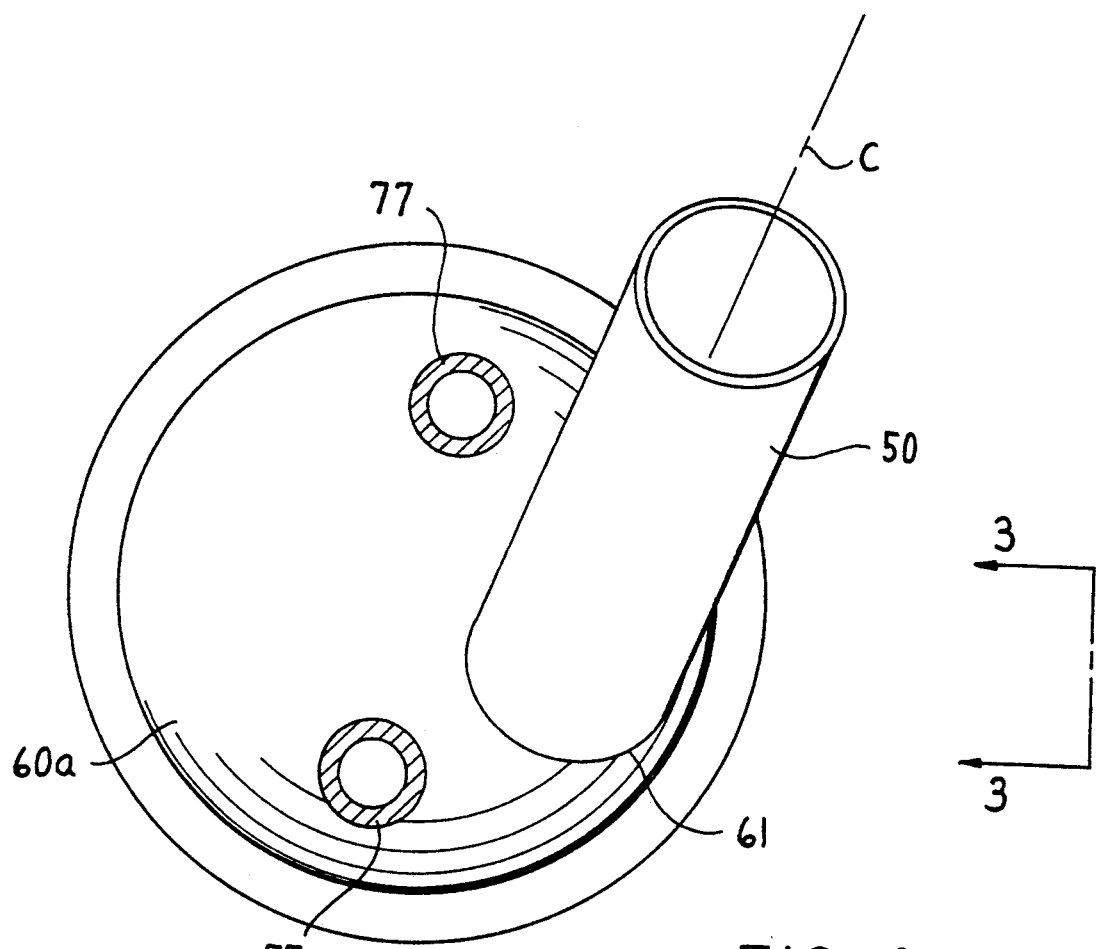
FIG. 4 is a top elevational view of the powder separator/collector device of FIG. 1.

As mentioned hereabove, the inlet conduit 50 is oriented at a compound inclined angle with respect to horizontal reference plane P as best shown in FIGS. 2-4, to achieve a desired trajectory of the powder laden gas stream into the expansion chamber 64. For example, the compound angle comprises a first entrance angle A1 that is greater than the natural angle of repose of the powder on the housing interior wall 62 such that any powder accumulation in the inlet conduit 50 tends to flow down the wall 62 toward the outlet 66 for collection in the container 68. The angle A1 is measured relative to lower horizontal reference plane P in the direction shown in FIG. 3.

The angle of repose of the powder means the surface angle beyond which a given loose powder on the surface will begin to naturally or inherently slump and slide down the surface by gravity action. An exemplary angle A1 of 60° is illustrated in FIG. 3 for use with loose atomized powder comprising a transient powder clump 91 on a surface comprising Type 304 stainless steel having a mirror polished (no. 8) surface finish, although other angular values from, for example, 50° to 74° for angle A1 may be used depending on the particular powder size and material, surface material (surface friction) and housing surface finish encountered. By using an entrance angle Al greater than the angle of repose, any accumulations of powder that tend to develop during the atomization operation in the inlet conduit 50 will have a great tendency to flow down the interior wall 50a of the inlet conduit 50 and down the interior wall 62 into the container 68.

As shown in FIG. 2, the second angle A2 of the aforementioned compound angle is selected generally equal to the angle A3 of the housing interior wall 62 so as to direct the gas stream into the expansion chamber at an angle that is generally tangent to the taper of the interior wall 62, whereby a downward swirling gas stream flow is established in the expansion chamber 64. The angle A2 is measured relative to the lower horizontal reference plane P in the direction shown in FIG. 2. Angles A2, A3 preferably from 75° to 90° can be used in practicing the invention. In effect, a downwardly directed helical gas stream flow is established in the chamber 64 to sweep the interior wall 62 in a manner to generate mild frictional forces between the entrained powder particles and the wall 62 to reduce the tangential velocity of the powder particles. This reduction in tangential velocity of the powder particles promotes powder separation from the gas stream.

The compound angle comprising angles A1 and A2 is formed by the following procedure in attaching the inlet conduit 50 to the domed top 60. The inlet conduit 50 is first positioned diametrically (i.e. a diameter of the conduit 50 is parallel with a diameter of the top 60) over the opening 61 in the domed top 60 at the desired entrance angle A1 relative to the horizontal plane P; e.g. the 60° exemplary angle A1 set forth hereabove. Then, the inlet conduit 50 is rotated about a point formed between the horizontal plane P and the central conduit axis C (located at the pre-established entrance angle A1 of e.g. 60°) to the second angle A2 generally equal to the wall angle A3 (e.g. 75°) as measured from the same horizontal plane P. In other words, by looking at FIG. 2, the second angle A2 is made by rotating the inlet conduit 50 to the same 75° angle made by the interior wall 62 while still maintaining the pre-established first 60° angle A1 made by the inlet conduit 50 relative to plane P (the initial pre-rotated position of conduit 50 being shown in phantom in FIG. 2).

The separator/collector device 2 described hereabove is constructed to combine the inherent slumping property of loose powders on an inclined surface that exceeds their natural angle of repose and the effects of the expansion chamber 64 to cause the powder-laden gas stream to expand and reduce the gas velocity upon entering the chamber 64 without reducing the downward momentum of the powder particles. The immediate drop in gas velocity in the chamber 64 encourages the powder particles to separate from the gas stream and to settle downwardly toward the container 68 under combined existing particle momentum and the pull of gravity. Further, by introducing the gas stream into the chamber 64 at an angle tangent to the interior wall 62, the downwardly swirling gas stream is caused to sweep the wall 62 as described hereabove to reduce tangential particle velocity and promote powder particle separation from the gas stream.

The separator/collector device 2 eliminates unintended accumulation regions of powder to permit collection of improved yields of powder in the container 68 which may be sealed for subsequent powder handling. Moreover, the device 2 can be used to collect powder sizes wherein the majority of particles have a diameter greater than 20 microns and also to collect ultrafine powder particles wherein a majority of particles have a diameter of less than 20 microns. Contamination of the powders by erosion of the housing wall 62 is expected to be reduced as a result of the mild frictional forces accompanying the helical swirl of the gas stream in the expansion chamber 64. The device 2 is passive in that no external power is required to effect its operation. The device 2 can be fitted to many existing atomization systems.

Referring to FIG. 1 again, a pair of exhaust conduits 77 (4 inch diameter) are shown exiting the top 60a of the housing 60. Only one of these exhaust conduits is shown extending to a conduit 79 that terminates at a small diameter (e.g. 6 inch diameter) secondary cyclone powder collector 80. The conduits 77 exhaust the low velocity gas stream from the expansion chamber 64 to one or more cyclone collectors 80 (one shown) where any remaining ultrafine powders are separated from the gas stream and collected. The cyclone collector 80 communicates to a secondary powder collection container 82 via valves 84*a*, 84*b* in a manner similar to container 68. The powder separated from the gas stream in the cyclone collector 80 is collected in the container 82 for further processing.

From the cyclone collector 80, the gas stream is directed through a conduit 90 to a conventional wet scrubber 92 also mounted on a wheeled carrige 93 and then exhausted to atmosphere.

While the invention has been described in terms of specific embodiments thereof, it is not intended to be limited thereto but rather only to the extent set forth in the following claims.

The embodiments of the invention in which an exclusive property or privilege is claimed are defined as follows:

1. A device for separating and collecting powder from a gas stream, comprising a housing having interior wall means oriented at an angle relative to horizontal so as to form a downwardly converging, conical expansion chamber, an inlet conduit communicated to the expansion chamber proximate an upper region thereof for receiving said gas stream, and an outlet proximate a lower region of said expansion chamber, said inlet conduit being oriented at a compound inclined angle with respect to horizontal, said compound angle comprising a first entrance angle that is greater than the angle of repose of said powder on said wall means such that any powder accumulation proximate the inlet conduit tends to flow down the wall means toward said outlet, and comprising a second angle that is generally equal to the angle of said interior wall means so as to introduce said gas stream to said chamber generally tangent to said interior wall means to establish a downward swirling gas stream flow in said chamber.

2. The apparatus of claim 1 wherein said first angle is less than said second angle.

3. The apparatus of claim 2 wherein said first angle is about 55° to about 74°.

4. The apparatus of claim 3 wherein said second angle is about 75° to about 90°.

5. The apparatus of claim 1 wherein said second angle is formed by rotating said inlet conduit about a point where the inlet conduit central axis intersects a horizontal plane defined by the top of said expansion chamber while maintaining said first angle.

6. The apparatus of claim 1 wherein said apparatus includes a powder container communicated to said outlet.

7. Atomizing apparatus comprising an atomizing chamber where a melt is gas atomized to form atomized powder entrained in a gas stream, and a powder collection device for separating and collecting powder from the gas stream, said device comprising a housing having interior wall means oriented at an angle relative to horizontal so as to form a downwardly converging, conical expansion chamber, an inlet conduit communicating an upper region of said expansion chamber to said atomizing chamber for directing said gas stream into said expansion chamber, and an outlet proximate a lower region of said expansion chamber, said inlet conduit being oriented at a compound inclined angle with respect to horizontal, said compound angle comprising a first entrance angle that is greater than the angle of repose of said powder on said wall means such that any powder accumulation proximate the inlet conduit tends to flow down the wall means toward said outlet, and comprising a second angle that is generally equal to said angle of said interior wall means so as to direct said gas stream into said expansion chamber generally tangent to said interior wall means to establish a downward swirling gas stream flow in said expansion chamber.

8. The apparatus of claim 7 wherein said first angle is less than said second angle.

9. The apparatus of claim 8 wherein said first angle is about 55° to about 74°.

10. The apparatus of claim 9 wherein said second angle is about 75° to about 90°.

11. The apparatus of claim 7 wherein said second angle is formed by rotating said inlet conduit about a point where the inlet conduit central axis intersects a horizontal plane defined by a top of said chamber while maintaining said first angle.

12. The apparatus of claim 7 wherein said apparatus includes a powder container communicated to said outlet.

13. The apparatus of claim 7 further comprising a gas stream outlet proximate the upper region of said expansion chamber and a cyclone collector communicated to said gas stream outlet for collecting atomized powder entrained in the gas stream flowing from said expansion chamber through said gas stream outlet.

14. Atomizing apparatus comprising an atomizing chamber where a melt is gas atomized to form atomized powder entrained in a gas stream, and a powder collection device for separating and collecting powder from the gas stream, said device comprising a housing having interior wall means oriented at an angle relative to horizontal so as to form a downwardly converging, conical expansion chamber, an inlet conduit communicating an upper region of said expansion chamber to said atomizing chamber for directing said gas stream into said expansion chamber, and an outlet conduit being oriented at a compound inclined angle with respect to horizontal, said compound angle comprising a first entrance angle that is greater than the angle of repose of said powder on said wall means such that any powder accumulation proximate the inlet conduit tends to flow down the wall means toward said outlet, and comprising a second angle that is selected relative to said angle of said interior wall means to direct said gas stream into said expansion chamber generally tangent to said interior wall means to establish a downward swirling gas stream flow in said expansion chamber.

15. The apparatus of claim 14 wherein said first angle is about 55° to about 74°.

16. The apparatus of claim 15 wherein said second angle is about 75° to about 90°.

* * * * *

UNITED STATES PATENT AND TRADEMARK OFFICE
CERTIFICATE OF CORRECTION

PATENT NO.   :   5 277 705
DATED        :   January 11, 1994
INVENTOR(S)  :   Iver E. ANDERSON, et al It is certified that error appears in the above-identified patent and that said Letters Patent is hereby corrected as shown below:

Column 8, line 9;   after "outlet" insert ---proximate a lower region of said expansion chamber, said inlet---.

Signed and Sealed this

Fourteenth Day of June, 1994

Attest:

BRUCE LEHMAN

Attesting Officer    Commissioner of Patents and Trademarks